E. P. HAYES.
COTTON PICKING MACHINE.
APPLICATION FILED MAY 10, 1920.
1,401,076.
Patented Dec. 20, 1921.
7 SHEETS—SHEET 1.
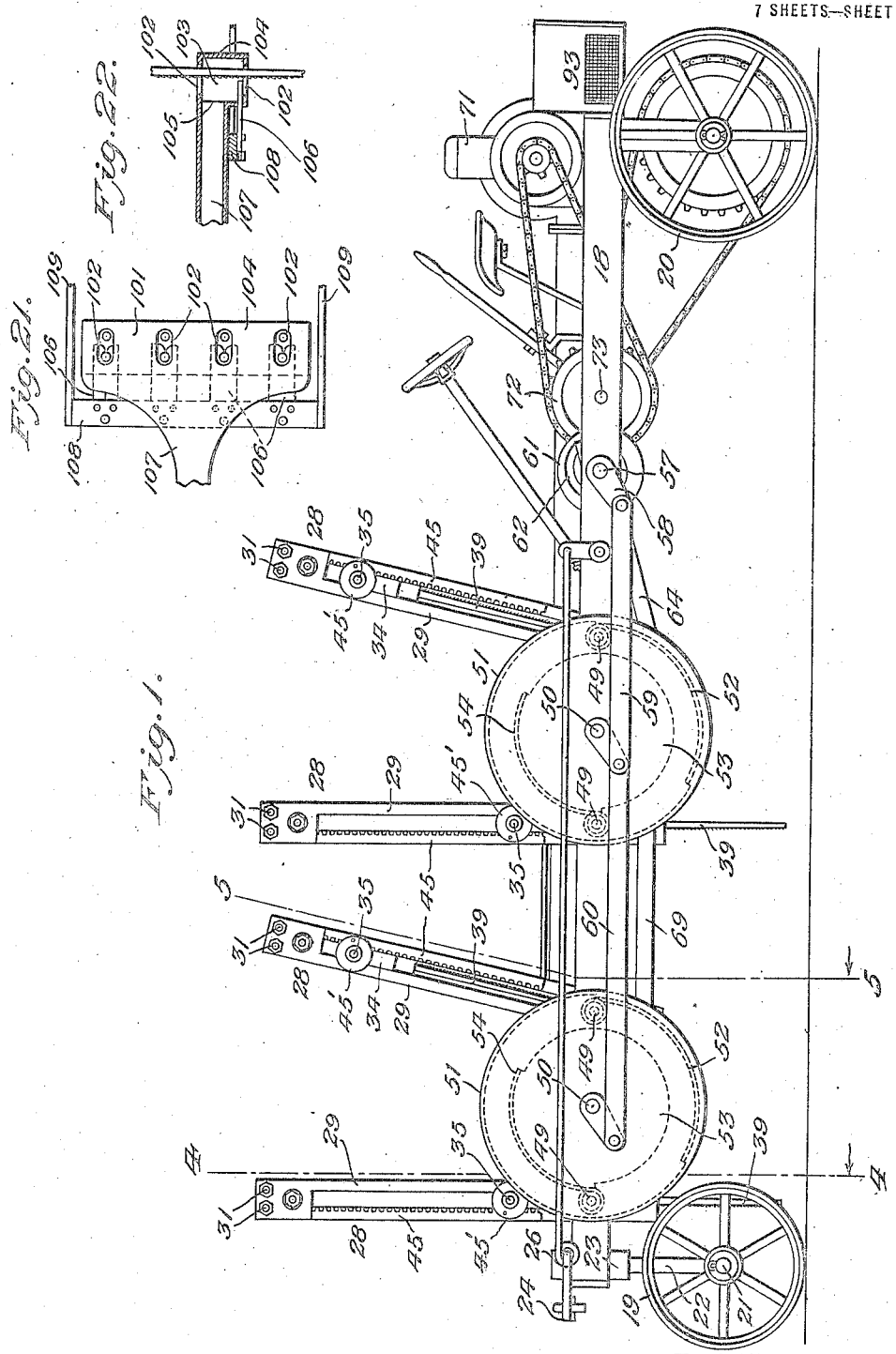
E. P. Hayes INVENTOR
BY Victor J. Evans
ATTORNEY

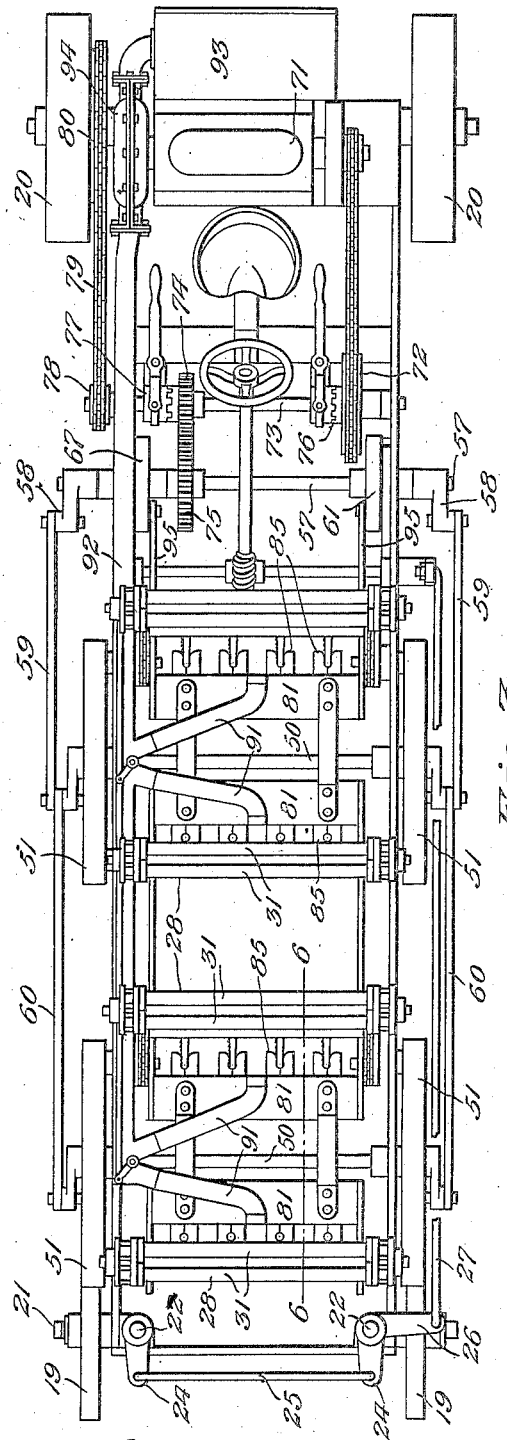

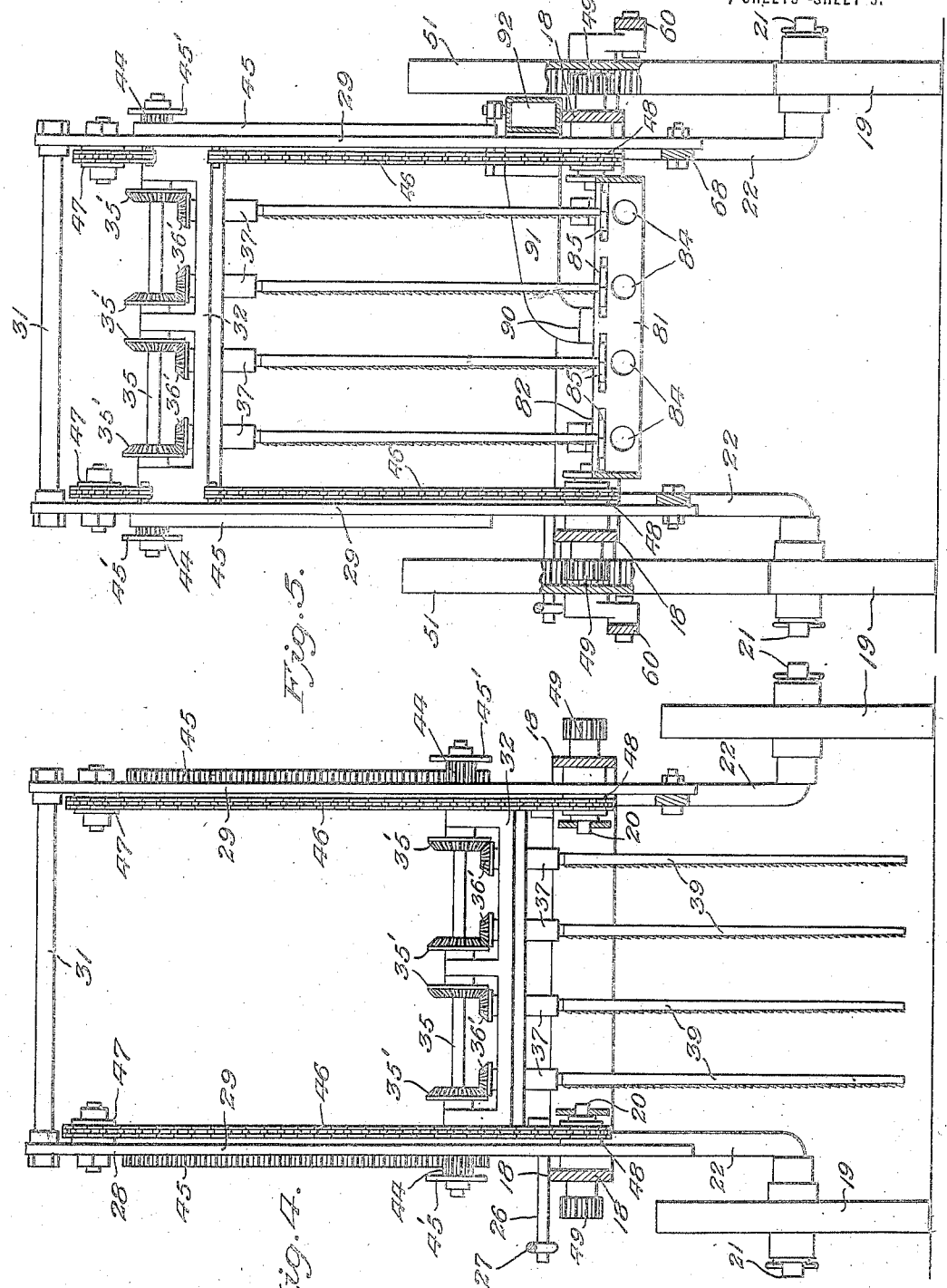

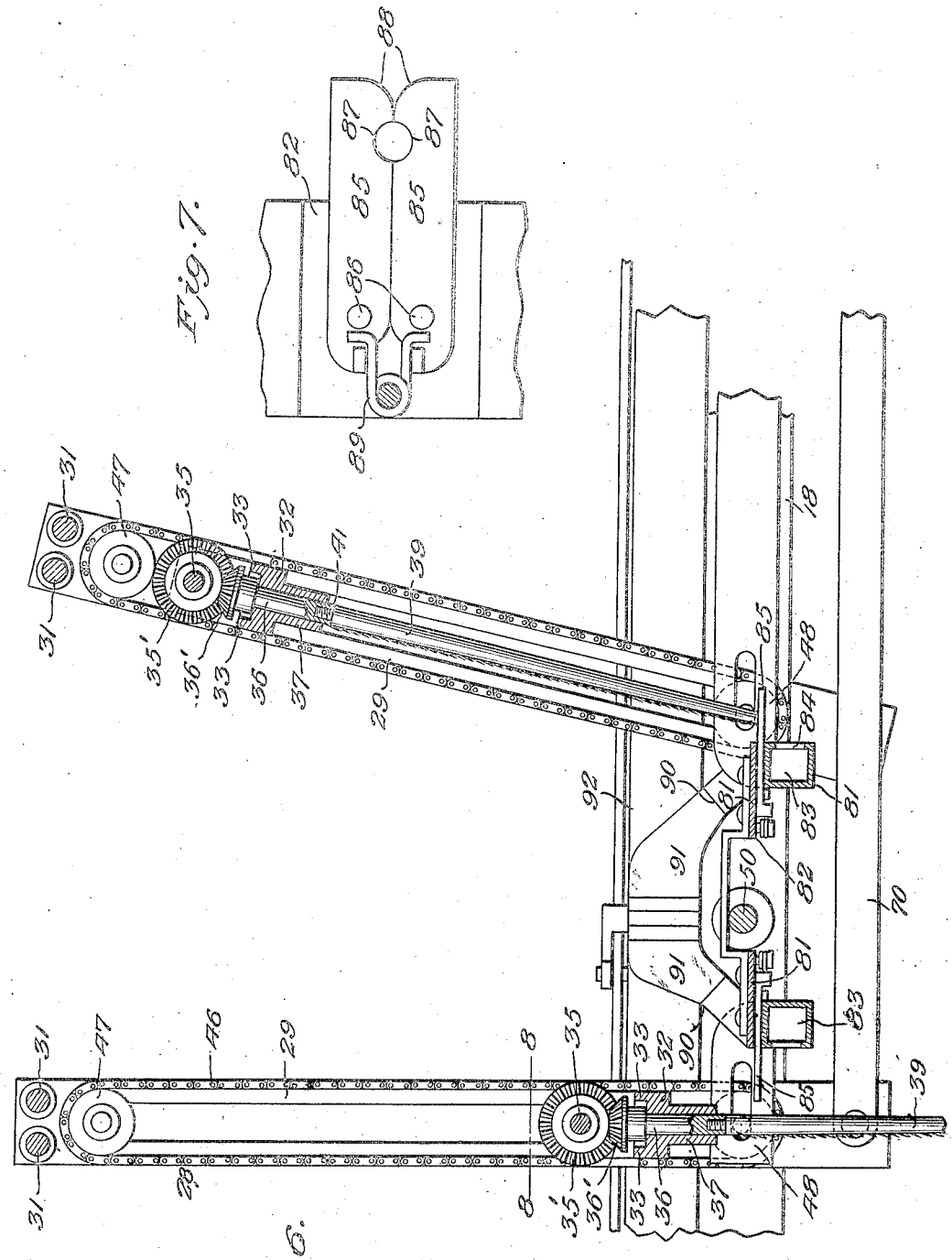

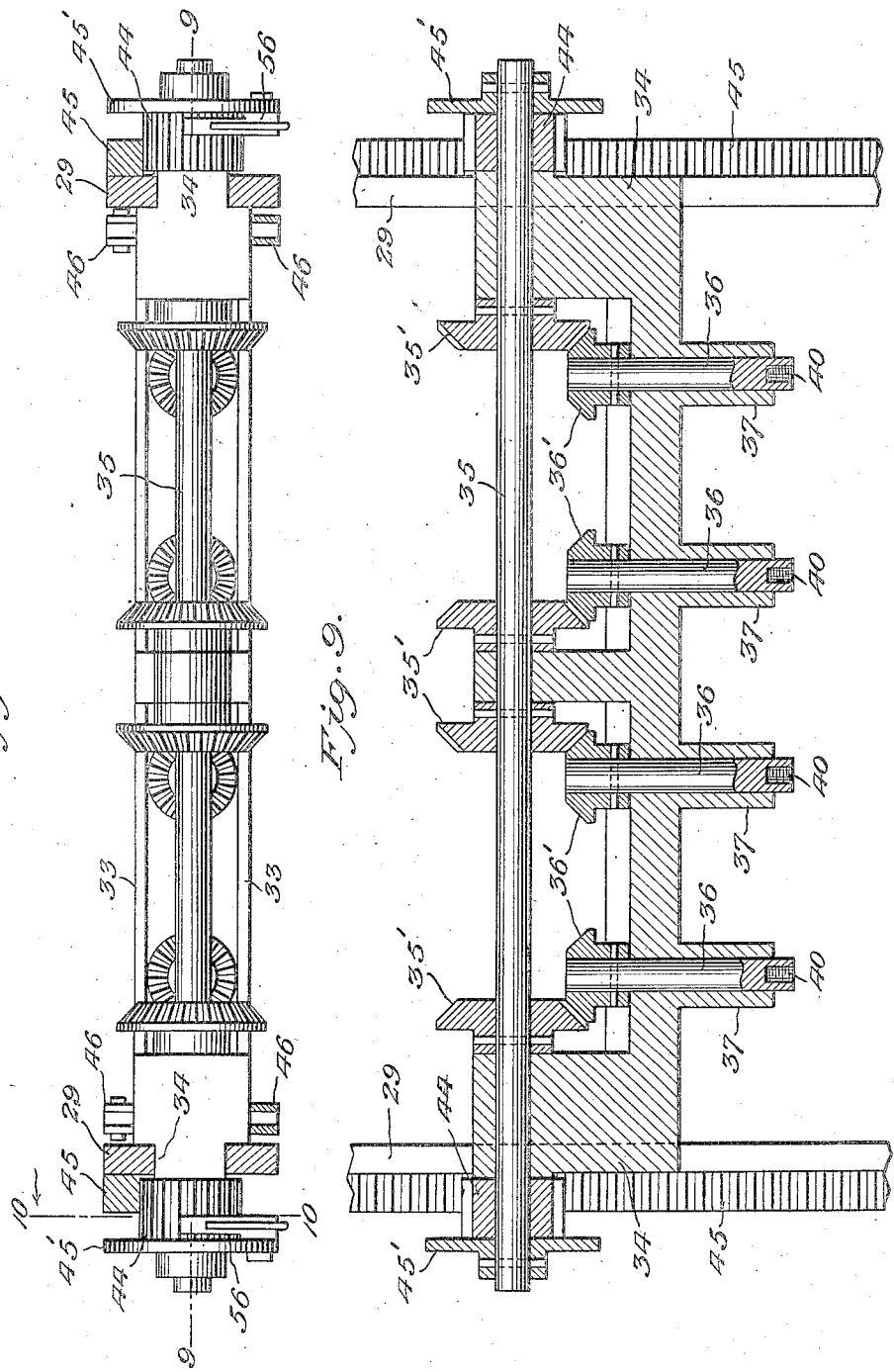

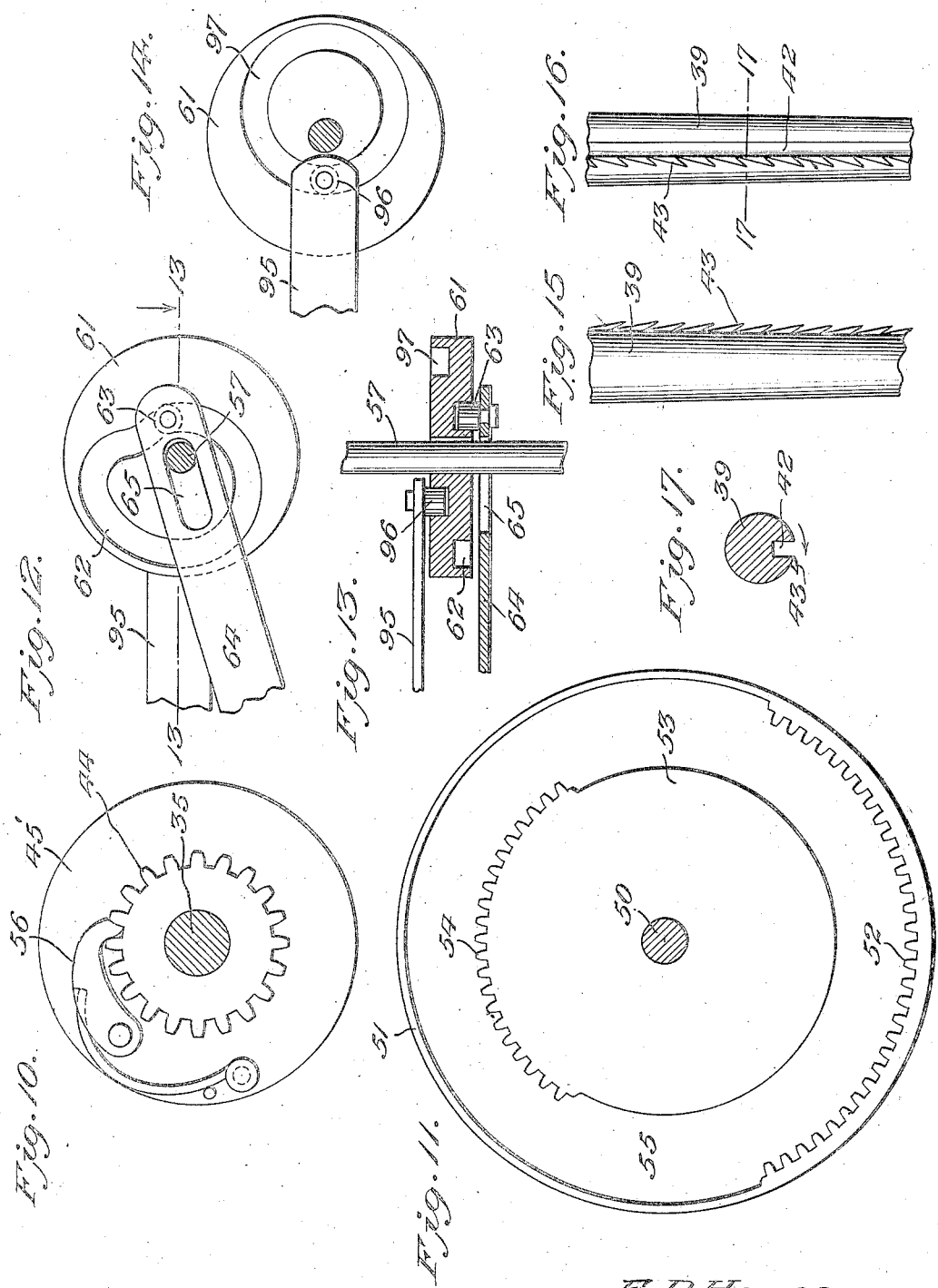

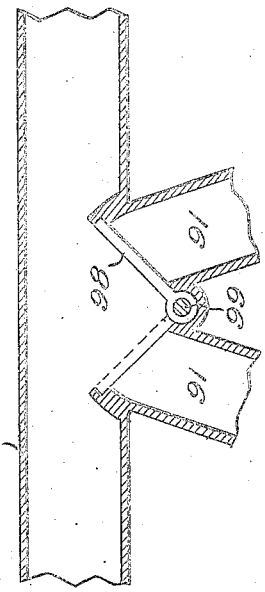
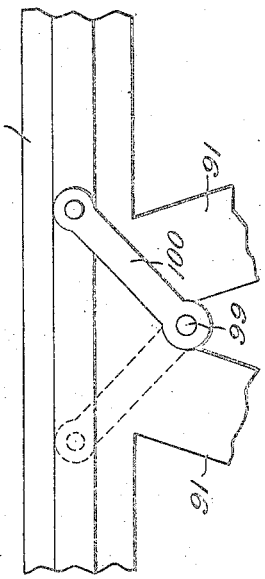
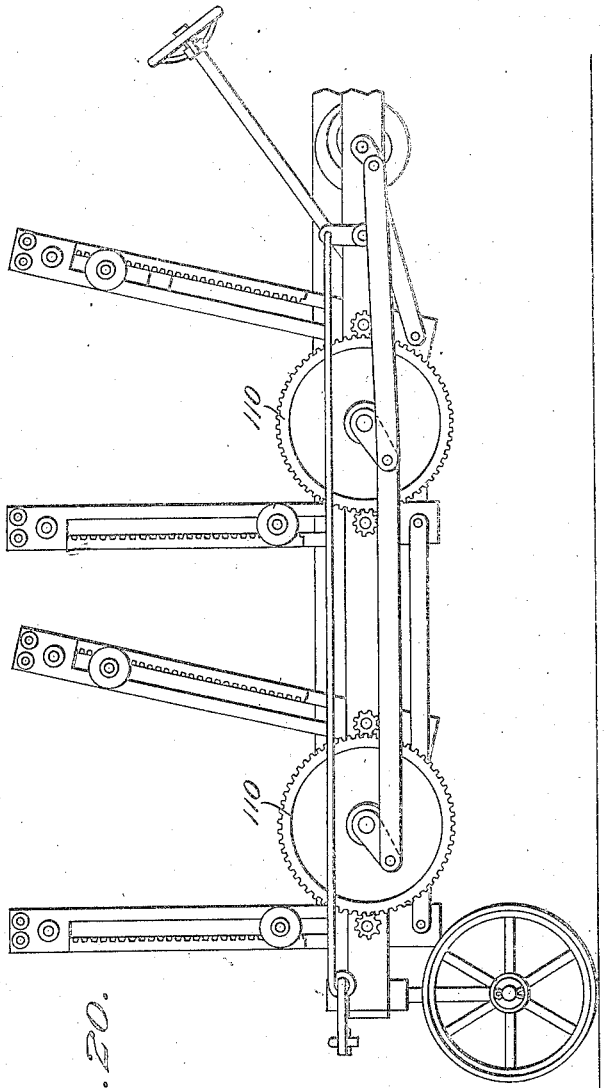

UNITED STATES PATENT OFFICE.

EDGAR P. HAYES, OF DILLON, SOUTH CAROLINA.

COTTON-PICKING MACHINE.

1,401,076.　　　　　Specification of Letters Patent.　　Patented Dec. 20, 1921.

Application filed May 10, 1920. Serial No. 380,406.

*To all whom it may concern:*

Be it known that I, EDGAR P. HAYES, citizen of the United States, residing at Dillon, in the State of South Carolina, have invented new and useful Improvements in Cotton-Picking Machines, of which the following is a specification.

This invention relates to improvements in machines for picking cotton and aims to provide a machine which may be moved along one or more rows of plants to automatically remove the cotton from the boll and convey it to a suitable receptacle or container.

To this end the invention contemplates the provision of a plurality of vertically movable rotatable spindles, capable of being moved into contact with the cotton for the purpose of removing the same from the boll, together with means for automatically removing the cotton from the spindles and conveying it to a suitable receptacle or container carried by the machine.

A further object is the provision of a machine of this character which is self propelled and in which the propelling means is utilized to bear the cotton picking mechanism.

Other objects and advantages of the invention will appear as the following description is read in connection with the accompanying drawings.

In the drawings:—

Figure 1 is a side elevation of a cotton picking machine embodying the present invention.

Fig. 2 is a top plan view of the same.

Fig. 3 is an end view.

Fig. 4 is a vertical transverse sectional view on the line 4—4 of Fig. 1.

Fig. 5 is a similar view on the line 5—5 of Fig. 1.

Fig. 6 is an enlarged fragmentary longitudinal section through one end of the machine.

Fig. 7 is a detailed bottom plan view of the cotton stripping device.

Fig. 8 is an enlarged horizontal section on the line 8—8 of Fig. 6.

Fig. 9 is a sectional view on the line 9—9 of Fig. 8.

Fig. 10 is a similar view on the line 10—10 of Fig. 8.

Fig. 11 is a detailed view of one of the driving gears.

Fig. 12 is a similar view of the cam for operating the pivoted frames.

Fig. 13 is a section on the line 13—13 of Fig. 12.

Fig. 14 is an elevation of the eccentric for operating the movable suction chambers.

Fig. 15 is an enlarged view of one of the spindles.

Fig. 16 is a view at right angles to Fig. 15.

Fig. 17 is a cross section of one of the spindles.

Fig. 18 is a detailed plan view showing the operating means for the gate of the conduit.

Fig. 19 is a horizontal section taken through Fig. 18.

Fig. 20 is a view showing a modified form of driving mechanism for operating the carried frames.

Fig. 21 is a modified form of suction chamber.

Fig. 22 is a transverse sectional view of the same.

Referring specifically to the drawings, wherein like characters of reference denote corresponding parts, the machine as shown comprises a frame 18 which is rectangular in plan and is supported by front steering wheels 19 and rear driving wheels 20. The front steering wheels 19 are mounted upon spindles 21 which are carried at the lower ends of vertical rods 22, mounted for rotation in bearings 23 located at the forward end of the frame 18. The upper ends of the rods 22 have connected thereto an arm 24, the arms of each of these rods being connected by a rod 25 so that the vertical rods 22 will rotate in unison. One of the rods 22 has connected thereto an arm 26, to which is connected one end of a rod 27, this last mentioned rod is connected to suitable steering mechanism located within convenient reach of the operator to provide for steering.

The novelty of the invention resides in the means for removing the cotton from the boll and conveying it to a suitable receptacle and for this purpose there is pivotally mounted upon the frame 18 a number of pivoted spindle frames 28. The spindle frames include slotted side bars 29 which are mounted for pivotal movement upon stub shafts 30, the latter having bearing in the side bars of the frame 18. The slotted side bars are connected at their upper ends by rods 31 so as to properly space them apart at this end. The frames 28 may be of any desired width so as to bridge one or more rows of cotton and the machine may be equipped with any number of these frames, the one illustrated having 4.

Mounted for sliding movement in each of the frames 29 is a carriage 32, the latter consisting of a cross member which is substantially T shaped in cross section and is provided along its opposite side edges with flanges 33. Located at the end of the carriage 32 is a guide 34 which operates in the slot of the side bar of the frame and provides a bearing for a shaft 35.

Rotatably mounted in the carriage 32 is a plurality of spaced vertical shafts 36 which are mounted for rotation in bearings provided in the carriage. These shafts extend downwardly through bearing sleeves 37 which depend from the carriage and have detachable engagement at their lower ends with spindles 39. For this purpose, the lower end of the shaft 36 is provided with a threaded socket 40 which receives a reduced threaded projection 41 carried by one end of the spindle 39. As shown, the spindles 39 are longitudinally slotted as at 42 and are provided upon opposite sides of this slot with inclined notches 43 so as to form spurs for engagement with the cotton when the spindles are lowered into contact therewith.

The carriage 34 is capable of vertical movement in the frame 28 and for this purpose the shaft 35 has secured thereon near each end a pinion 44 which engages a rack bar 45 which is disposed longitudinally of each of the side bars 29 near one edge of the slot. The rack 45' is positioned upon the shaft 35 in contact with the outer face of each of the pinions 44.

In order to operate the carriage 32 there is provided upon opposite sides of the frame 28, a sprocket chain 46 which travels over upper and lower sprockets 47 and 48 respectively and has its opposite ends connected to a carriage 32. The lower sprockets 48 are secured upon the stub shafts 30 within the frame 28, while mounted upon these shafts upon the outside of the main frame 18 are pinions 49.

Mounted in bearings carried by the frame 18 is a shaft 50 and secured upon the opposite ends of this shaft and upon the outside of the frame 18 is a driving gear 51. This gear includes internal teeth 52 which are arranged around the inside of the frame of the gear approximately one half of its circumference, while projecting from the hub of the driving gear 51, is a disk 53 which is provided around approximately one half of its peripheral edge with teeth 54, the last mentioned teeth being arranged in opposite relation to the teeth 52. A slot 55 is thus provided in the drive gear 51 which is toothed for approximately one half of its circumference around its outer wall and for approximately one half of its circumference around its inner wall, these teeth alternately engaging the teeth of the pinions 49 upon the stub shafts 30 upon which two adjacent frames 28 are pivoted.

The frames are thus arranged in pairs and the carriages of each pair are adapted to be alternately operated. That is, while one carriage of a pair of frames is moving upward, the other carriage of the same pair will be moving downward. The pinions 44 are normally loose upon the shafts 35, but are locked upon said shafts by means of a spring actuated dog 56 which is carried by one of the disks 45. This provides for rotating the spindles during their downward movement only. Power is applied to the driving gears 51 by the shaft 57 which is mounted in bearings in the frame 18. This shaft extends through the frame and having mounted thereon a crank arm 58 which is connected by means of a rod 59 with the gear 51 of one pair of pivoted frames the gear 51 of the other pair of pivoted frames is connected by means of a link 60, so that the spindles of one frame of each pair will be moving downward and the spindles of the other frame of each pair upward. Also mounted upon the shaft 57 is a wheel 61 which is provided in one face thereof with an eccentric groove 62 and operating within this groove is a pin or roller 63 which is carried at one end of a rod 64. This rod is provided adjacent the pin or roller 63 with a slot 65 which engages over the shaft 57 while the opposite end of the rod 64 is adjustably connected to the lower end of the rearmost frame 28. Secured upon the shaft 57 near its opposite end is a disk 67 similar to the disk 61 and this disk is provided with an eccentric groove which is engaged by a roller carried by one end of an arm 68, similar to the arm 64. The opposite end of this arm is adjustably connected to the second rearmost frame 28 and the cam grooves of the disks 61 and 67 are so disposed as to alternately rock one frame of an arm upon its pivot. Links 69 and 70 connect the alternate frames of each pair so as to move them in unison.

Suitably mounted upon the frame 18 is a motor 71 and this motor is geared to a sprocket 72 which is mounted for free rotation upon the shaft 73 disposed parallel to the shaft 57. Also loosely mounted upon the shaft 73 is a gear 74 which engages and drives a sprocket 75 fast upon the shaft 57. A clutch 76 serves to lock the sprocket 72 to the shaft 75, while a clutch 77 is provided to lock the gear 74 to this shaft. The shaft 73 extends from the frame 18 and has connected thereto a sprocket 78 which operates a chain 79 to drive a gear 80 secured to one of the rear drive wheels 20. If desired this gearing may be duplicated upon opposite sides of the frame 18. Through the gearing just described, the clutch 76 may be operated to drive the machine over the ground, while the clutch 77 may be operated to control the operation of the cotton picking mechanism.

Mounted between the spindles of each pair of spindle frames, is a suction chamber 81. The suction chambers are of double formation and comprise a plate 82 which is disposed transversely of the shaft 50 and is provided along its opposite side edges with compartments 83. Each of these compartments is provided upon its outside wall with openings 84, there being one of these openings for each spindle. Mounted for pivotal movement beneath the plate 82 and located above each of the openings 84 is a pair of fingers 85, their pivotal mounting being shown at 86. These fingers extend beyond the opposite side edges of the plate 82 and are provided with opposed notches 87 for the reception of the spindles 39. Each pair of fingers 85 is provided with a beveled entrance 88 through the notches 87. The opposite ends of the fingers are urged apart by a spring 89.

Communicating with each of the suction chambers 83 as shown at 90 is a flexible conduit 91, the conduits of one pair of suction chambers communicating with the main conduit 92 at approximately the same point, while this main conduit communicated with a receptacle 93 which is adapted to receive the picked cotton, the cotton being conveyed thereto by means of the suction fan 94 which is operated by the motor 71, in a manner herein explained.

The fingers 85 are alternately moved into and out of engagement with the spindles 39 and for this purpose there is connected to the opposite ends of the suction chambers, rods 95, the inner ends of which carry pins or rollers 96 for engagement with eccentric grooves 97, formed in the opposite faces of the disks 61.

As the machine is moving over the ground, assuming that the clutch 77 is engaged to operate the shaft 57, the driving gears 51 will be rotated to alternately raise and lower the carriages of each pair of pivoted frames, the frames of the carriage of each pair descending so as to lower the spindles, which, during this lowering movement are rotated. For this purpose the pinions 49 of the lowering spindles are engaged by the teeth 52 of the driving gears 51, so that the lowering movement will be relatively slow, while the pinions 49 of the rising spindles are engaged with the teeth 54 and their upward movement will be relatively fast.

While the spindles are moving downward, their frame 28 is tilted rearward to the position of the eccentric groove 62, while the fingers 85 which are carried by the plate 82 are disengaged from the spindles, due to the position of the eccentric groove 97. During this downward movement the spindles are rotating as the pinions 44 are locked upon the shafts 35, so that when these spindles engage or touch the cotton, the latter is twisted firmly around the spindles and as the spindles start to rise the cotton is pulled from the boll. At the start of the upward movement of the spindles, the disks 61 are rotated to bring the eccentric grooves 97 into position so that the fingers 85 will engage the spindles 39 which are lowered. In the meantime, the frames are moved upon their pivots 35 to a vertical position and the carriage 32 will move upward with the spindles not rotated and traveling through the opening provided by the notches 87 in the fingers 85. When the cotton carried by the spindles engage these fingers it is stripped from the spindles and the suction of the fan 94 will serve to draw the cotton inward toward openings 84 of the suction chambers and convey the same through the conduits to the receptacle.

In order to close the conduit 91 not in use, there is provided at the juncture of this conduit a gate 98. This gate is mounted for pivotal movement as shown at 99 and carries an arm 100 which is engaged and operated by the movement of the plate 82 to cut off the proper conduit.

In Fig. 21 there is illustrated a modified form of spindle stripping means. This includes a stationary plate 101 which is mounted in the frame 18 between the spindle frames and is provided with elongated openings 102 for the passage of the spindles. The plate 101 is arranged so that the openings 102 are disposed along its opposite edges for the passage of the spindles of one pair of frames. These spindles pass downward through the openings 102 and disposed beneath these openings is a channel 103 which includes front and rear walls 104 and 105 respectively, the top wall of the channel being formed by the plate 101.

As the spindles move upward from the openings 102, the cotton passes into the channel 103, being stripped from the spindles by the fingers 106 which are similar in construction to the fingers 85 previously described. These fingers are disposed above the openings 102 and as the cotton is stripped from the spindles it is drawn into a flared mouth 107 which communicates with a conduit similar to the main conduit 92. By making the openings 102 of elongated shape, provision is made for moving the fingers 106 out of engagement with the spindles during the downward movement of the latter and into engagement with said spindles during their upward movement.

Any suitable means may be employed for moving the fingers 106, for example, the fingers may be connected to a common bar or plate 108 which is in turn conected by a rod 109 to an eccentric such as shown and described in connection with the first mentioned form of the invention.

In Fig. 16 there is illustrated a modified form of spindle operating means in which the speed of the spindles during their upward and downward movement is the same. This consists in merely providing a gear 110 which engages with a drive the pinions 49 and it is in turn driven by the same means as were described in connection with the gear 51.

The invention is susceptible of various changes in its form, proportions and minor details of construction and the right is herein reserved to make such changes as properly fall within the scope of the appended claims.

Having described the invention what is claimed is:—

1. A cotton picking machine embodying a plurality of vertically movable rotatably mounted picking spindles, means whereby said spindles will be moved upwardly and downwardly, means whereby the spindles will be disposed in a forwardly inclined position during their downward movement to pick the cotton, means whereby the spindles will assume a vertical position during their upward movement, means for stripping the spindles during their upward movement and means for transferring the cotton from the stripped spindles to a receptacle.

2. A cotton picking machine embodying a plurality of vertically movable rotatably mounted picking spindles, means whereby said spindles will be moved upwardly and downwardly, means whereby the spindles will be disposed in a forwardly inclined position during their downward movement to pick the cotton, means for stripping the spindles during their upward movement, means whereby the spindles will be moved upward at a greater speed than their downward movement and means for transferring the cotton from the stripped spindles to a receptacle.

3. A cotton picking machine embodying a plurality of vertically movable rotatably mounted picking spindles, means including a driving pinion whereby said spindles will be moved upwardly and downwardly, means whereby the spindles will be disposed in a forwardly inclined position during their downward movement to pick the cotton, means for stripping the spindles during their upward movement, an internal and external gear alternately engaging said pinions for varying the speed of the spindles during their upward and downward movement and means for transferring the cotton from the stripped spindles to a receptacle.

4. A cotton picking machine embodying a plurality of vertically movable rotatably mounted picking spindles, means whereby said spindles will be moved upwardly and downwardly, means movable into and out of the path of the spindles for stripping the same during their upward movement and means for tranferring the cotton from the stripped spindles to the receptacle.

5. A cotton picking machine embodying a plurality of vertically movable rotatably mounted picking spindles, means whereby said spindles will be moved upwardly and downwardly, spring held means movable into and out of engagement with the spindles for stripping the same during their upward movement and means for transferring the cotton from the stripped spindles to a receptacle.

6. A cotton picking machine embodying a plurality of vertically movable rotatably mounted picking spindles, means whereby said spindles will be moved upwardly and downwardly, means whereby the spindles will be disposed in forwardly inclined position during their downward movement to pick the cotton, spring held pivotally mounted fingers movable longitudinally and transversely of the machine into and out of engagement with the spindles for stripping the same during their upward movement and means for automatically transferring the cotton from the stripped spindles to a receptacle.

7. A cotton picking machine embodying a plurality of vertically arranged longitudinally movable rotatably mounted picking spindles, means whereby said spindles will be moved upwardly and downwardly, means whereby the spindles will be disposed in a forwardly inclined position during their downward movement only, means for stripping the spindles during their upward movement and means for transferring the cotton from the stripped spindles to a receptacle.

8. A cotton picking machine embodying a pivotally mounted vertically disposed frame, a carriage therein, means for moving the carriage upwardly and downwardly in said frame, a plurality of spindles rotatably mounted in the carriage, means whereby the spindles will be rotated during the downward movement of the carriage only, means for stripping the spindles during their upward movement and means for transferring the cotton from the stripped spindles to a receptacle.

9. A cotton picking machine embodying a pivotally mounted vertically disposed frame, a carriage movable therein, means for moving the carriage upwardly and downwardly in said frame, a plurality of spindles rotatably mounted in said carriage, means whereby the spindles will be rotated during the downward movement of the carriage only, means for rocking the frame upon its pivot to dispose the spindles in a forwardly inclined position during their downward movement and to a substantially vertical position during their upward movement, means for stripping the spindles during their upward movement and means for transferring the cotton from the stripped spindles to a receptacle.

10. A cotton picking machine embodying a pair of pivotally mounted vertically disposed frames, a plurality of vertically movable rotatably mounted picking spindles in each of said frames, means whereby the spindles of one frame will be moved downwardly while the spindles of the other frame are moving upwardly, means whereby the spindles of each frame will be disposed in a forwardly inclined position during their downward movement to pick the cotton, means for stripping the spindles during their upward movement and means for transferring the cotton from the stripped spindles to a receptacle.

11. A cotton picking machine embodying a pair of pivotally mounted vertically disposed frames, a plurality of vertically movable rotatably mounted picking spindles in each of said frames, means including a driving gear common to both frames whereby the spindles of one frame will be moved downwardly while the spindles of the other frame are moving upwardly, means whereby the spindles of each frame will be disposed in a forwardly inclined position during their downward movement to pick the cotton, means for stripping the spindles during their upward movement and means for transferring the cotton from the stripped spindles to a receptacle.

12. A cotton picking machine embodying a pair of pivotally mounted vertically disposed frames, a plurality of vertically movable rotatably mounted picking spindles in each of said frames, means whereby the spindles of one frame will be moved downwardly while the spindles of the other frame are moving upwardly, means whereby the spindles of each frame will be disposed in a forwardly inclined position during their downward movement to pick the cotton, means for stripping the spindles during their upward movement, said means including a slidably mounted member located between the frames, means located adjacent each side edge of said member for engagement with the spindles, means for moving said member so that the spindles are engaged during their upward movement only and means for transferring the cotton from the stripped spindles to a receptacle.

13. A cotton picking machine embodying a pair of pivotally mounted vertically disposed frames, a plurality of vertically movable rotatably mounted picking spindles in each of said frames, means whereby the spindles of one frame will be moved downwardly while the spindles of the other frame are moving upwardly, means whereby the spindles of each frame will be disposed in a forwardly inclined position during their downward movement to pick the cotton, means for stripping the spindles during their upward movement, said means including a slidably mounted member located between the frames, means located adjacent each side edge of said member for engagement with the spindles, means for moving said member so that the spindles are engaged during their upward movement only, suction means for transferring the cotton from the spindles to a receptacle and means operated by the movement of the slidably mounted member for automatically cutting off the suction means to the descending spindles.

14. A cotton picking machine embodying a pair of pivotally mounted vertically disposed frames, a plurality of vertically movable rotatably mounted picking spindles in each of said frames, means including a driving gear common to both frames, whereby the spindles of one frame will be moved downward while the spindles of the other frame are moving upward and the upwardly moving spindles will travel at a relatively increased speed, means whereby the spindles of each frame will be disposed in a forwardly inclined position during their downward movement to pick the cotton, means for stripping the spindles during their upward movement and means for transferring the cotton from the stripped spindles to a receptacle.

In testimony whereof I affix my signature.

EDGAR P. HAYES.